(12) United States Patent
Zenner et al.

(10) Patent No.: US 11,001,163 B2
(45) Date of Patent: May 11, 2021

(54) ELECTRIFIED VEHICLE WITH SPLITTABLE BATTERY AND ASSOCIATED METHOD

(71) Applicant: Ford Global Technologies, LLC, Dearborn, MI (US)

(72) Inventors: Thomas Zenner, Dueren (DE); Daniel Benjamin Kok, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 324 days.

(21) Appl. No.: 15/869,213

(22) Filed: Jan. 12, 2018

(65) Prior Publication Data

US 2019/0217719 A1    Jul. 18, 2019

(51) Int. Cl.
| | |
|---|---|
| *B60L 58/22* | (2019.01) |
| *B60L 50/50* | (2019.01) |
| *H02J 7/00* | (2006.01) |
| *H01M 10/44* | (2006.01) |
| *H01M 50/20* | (2021.01) |
| *B60L 50/60* | (2019.01) |
| *B60K 6/28* | (2007.10) |
| *B60L 1/00* | (2006.01) |
| *H01M 10/42* | (2006.01) |

(52) U.S. Cl.
CPC ............... *B60L 58/22* (2019.02); *B60K 6/28* (2013.01); *B60L 1/00* (2013.01); *B60L 50/50* (2019.02); *B60L 50/66* (2019.02); *H01M 10/425* (2013.01); *H01M 10/441* (2013.01); *H01M 50/20* (2021.01); *H02J 7/00* (2013.01); *B60Y 2200/91* (2013.01); *B60Y 2200/92* (2013.01); *B60Y 2400/112* (2013.01); *H01M 2010/4271* (2013.01); *H01M 2220/20* (2013.01); *Y10S 903/907* (2013.01)

(58) Field of Classification Search
CPC .. B60L 58/22; B60L 50/50; B60L 1/00; B60L 50/66; H02J 7/00; B60K 6/28; Y10S 903/907; H01M 2220/20; H01M 2010/4271; H01M 10/441; H01M 10/425; H01M 2/1077; B60Y 2400/112; B60Y 2200/92; B60Y 2200/91
USPC .......................................................... 701/22
See application file for complete search history.

(56) References Cited

U.S. PATENT DOCUMENTS

| | | | |
|---|---|---|---|
| 7,533,744 B2 | 5/2009 | Mack | |
| 7,675,261 B2 | 3/2010 | Elder et al. | |
| 7,728,547 B2 | 6/2010 | Lim et al. | |
| 8,125,181 B2 | 2/2012 | Gregg et al. | |
| 8,928,272 B2 | 1/2015 | Song | |

(Continued)

FOREIGN PATENT DOCUMENTS

CN          102231546 A    11/2011

*Primary Examiner* — Maceeh Anwari
(74) *Attorney, Agent, or Firm* — David B. Kelley; Carlson, Gaskey & Olds, P.C.

(57) ABSTRACT

An electrified vehicle according to an exemplary aspect of the present disclosure includes, among other things, a battery including a first strand of cells and a second strand of cells, an electric machine selectively powered by the battery, and at least one auxiliary component selectively powered by the battery. The battery is configurable such that the at least one auxiliary component is able to draw power from the first strand of cells but not the second strand of cells. A method is also disclosed.

19 Claims, 2 Drawing Sheets

(56) References Cited

U.S. PATENT DOCUMENTS

| | | |
|---|---|---|
| 9,422,906 B2 | 8/2016 | Kees et al. |
| 2012/0041627 A1* | 2/2012 | Kelty .................. B60L 15/2045 |
| | | 701/22 |
| 2012/0235626 A1 | 9/2012 | Oh et al. |
| 2015/0298574 A1* | 10/2015 | Bramson ............. B60L 15/2045 |
| | | 701/22 |
| 2017/0043670 A1 | 2/2017 | Zenner et al. |
| 2017/0096078 A1 | 4/2017 | Shin et al. |
| 2019/0160948 A1* | 5/2019 | Legnedahl .............. B60L 58/10 |

* cited by examiner

| TIME COMPONENT | T₁ (102) | T₂ (104) | T₃ (106) |
|---|---|---|---|
| FIRST OR SECOND ELECTRIC MACHINE 16, 24 | ACTIVE | ENGINE START (i.e., FIRST ELECTRIC MACHINE 16 ACTIVE) | INACTIVE |
| AUXILIARY COMPONENT(S) 32 | NOT ACTIVE | ACTIVE | ACTIVE |
| SWITCH 42 | CLOSED | OPEN | CLOSED |
| FIRST BATTERY STRAND 34 | 55% | 50% | 50% → 36% |
| SECOND AND THIRD BATTERY STRANDS 36, 38 | 55% | 30% | 30% → 36% |
| DC-TO-DC CONVERTER 46 | MAY BE ACTIVE | NOT ACTIVE | FIRST STRAND 34 CHARGES SECOND AND THIRD STRANDS 36, 38 VIA DC-TO-DC CONVERTER 46 |

FIG.2

ELECTRIFIED VEHICLE WITH SPLITTABLE BATTERY AND ASSOCIATED METHOD

TECHNICAL FIELD

This disclosure relates to an electrified vehicle having a splittable battery. The disclosure also relates to an associated method.

BACKGROUND

The need to reduce automotive fuel consumption and emissions is well known. Therefore, vehicles are being developed that reduce reliance on internal combustion engines. Electrified vehicles are one type of vehicle being developed for this purpose. In general, electrified vehicles differ from conventional motor vehicles because they are selectively driven, at least partially, by one or more battery-powered electric machines. Conventional motor vehicles, by contrast, rely exclusively on the internal combustion engine to drive the vehicle. Some electrified vehicles also include one or more auxiliary component, such as an electric brake, steering component, etc., that draws power from the same battery that powers the electric machine.

SUMMARY

An electrified vehicle according to an exemplary aspect of the present disclosure includes, among other things, a battery including a first strand of cells and a second strand of cells, an electric machine selectively powered by the battery, and at least one auxiliary component selectively powered by the battery. The battery is configurable such that the at least one auxiliary component is able to draw power from the first strand of cells but not the second strand of cells.

In a further non-limiting embodiment of the foregoing electrified vehicle, the battery is configurable such that the electric machine is able to draw power from the second strand of cells but not the first strand of cells.

In a further non-limiting embodiment of any of the foregoing electrified vehicles, the battery includes a third strand of cells, and wherein the battery is configurable such that the electric machine is able to draw power from the second and third strands of cells but not the first strand of cells.

In a further non-limiting embodiment of any of the foregoing electrified vehicles, the electrified vehicle further includes a controller and switch between the first and second strands of cells, the switch configured to open and close in response to instructions from the controller. Further, when the switch is open, the at least one auxiliary component is able to draw power from the first strand of cells but not the second strand of cells, and the electric machine is able to draw power from the second strand of cells but not the first strand of cells.

In a further non-limiting embodiment of any of the foregoing electrified vehicles, when the switch is closed, the first and second strands of cells are electrically coupled together in parallel.

In a further non-limiting embodiment of any of the foregoing electrified vehicles, when the switch is closed, the battery is configured to balance a state of charge of the first strand of cells and a state of charge of the second strand of cells.

In a further non-limiting embodiment of any of the foregoing electrified vehicles, when the switch is closed, both the at least one auxiliary component and the electric machine are able to draw power from the first and second strands of cells.

In a further non-limiting embodiment of any of the foregoing electrified vehicles, the electrified vehicle further includes a DC-to-DC converter between the first and second strands of cells.

In a further non-limiting embodiment of any of the foregoing electrified vehicles, the electrified vehicle includes a first and second electric machine. Further, the battery is configurable such that the first and second electric machines are able to draw power from the second strand of cells but not the first strand of cells.

In a further non-limiting embodiment of any of the foregoing electrified vehicles, the electric machine includes a belt-integrated starter-generator.

In a further non-limiting embodiment of any of the foregoing electrified vehicles, the at least one auxiliary component includes at least one of an electric brake component, a damper, a chassis component, and a steering component.

In a further non-limiting embodiment of any of the foregoing electrified vehicles, the first and second strands of cells each include a plurality of cells arranged in series, and wherein the first and second strands of cells each provide substantially the same nominal voltage.

In a further non-limiting embodiment of any of the foregoing electrified vehicles, the electrified vehicle is a mild hybrid vehicle.

A method according to an exemplary aspect of the present disclosure includes, among other things, powering at least one auxiliary component of an electrified vehicle with a first strand of cells of a battery but not a second strand of cells of the battery.

In a further non-limiting embodiment of the foregoing method, the method includes powering an electric machine of the electrified vehicle with the second strand of cells but not the first strand of cells.

In a further non-limiting embodiment of any of the foregoing methods, the method includes opening a switch between the first and second strands of cells.

In a further non-limiting embodiment of any of the foregoing methods, the switch is opened during one of a cranking and a traction assist operation.

In a further non-limiting embodiment of any of the foregoing methods, the method includes closing the switch, powering the at least one auxiliary component with the first and second strands of cells, and powering the electric machine with the first and second strands of cells.

In a further non-limiting embodiment of any of the foregoing methods, the method includes balancing a state of charge of the first strand of cells and a state of charge of the second strand of cells.

In a further non-limiting embodiment of any of the foregoing methods, the method includes converting current from one voltage level to another as it flows between the first strand of cells and the second strand of cells.

BRIEF DESCRIPTION OF THE DRAWINGS

FIG. 2 is a table representative of an example drive sequence.

DETAILED DESCRIPTION

Figure 1:
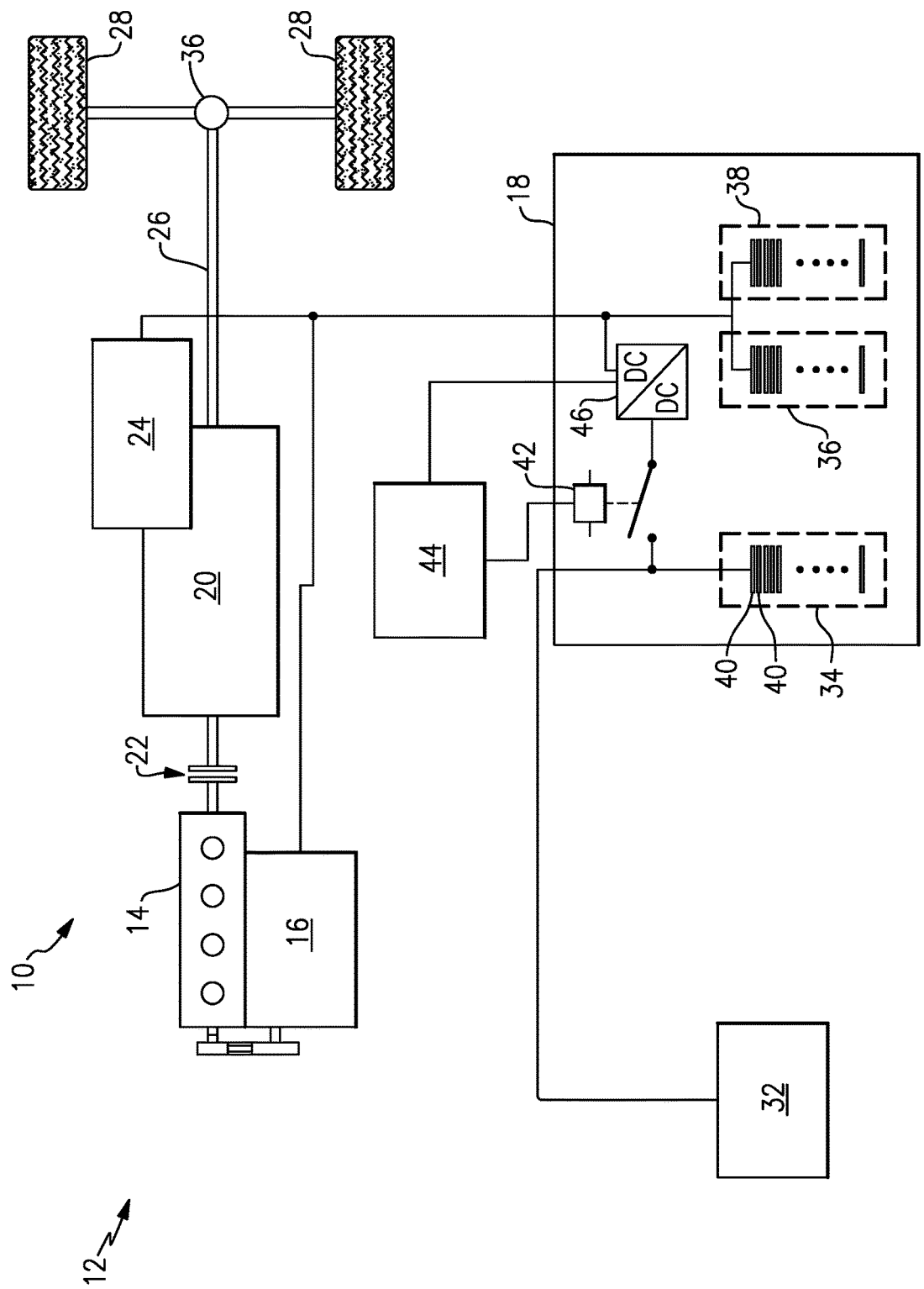
FIG. 1 schematically illustrates a powertrain of an electrified vehicle.

This disclosure relates to an electrified vehicle having a splittable battery. The disclosure also relates to an associated method. In particular, an electrified vehicle of this disclosure includes a battery with a first strand of cells and a second strand of cells, an electric machine selectively powered by the battery, and at least one auxiliary component selectively powered by the battery. The battery is configurable such that the at least one auxiliary component is able to draw power from the first strand of cells but not the second strand of cells. In this way, the auxiliary component can draw power from one section of the battery, and the electric machine can draw power from another section of the battery. Thus, operation of the auxiliary component is undisturbed by fluctuations in voltage caused by the relatively large power draw of the electric machine, for example.

FIG. 1 schematically illustrates an example powertrain 10 of an electrified vehicle 12. In one example, the powertrain 10 includes an engine 14 and a first electric machine 16. In this example, the first electric machine 16 is a belt-integrated starter-generator (BISG). The first electric machine 16 is electrically coupled to a battery pack 18 (or simply, "battery"). The engine 14 is selectively coupled to a transmission 20 by way of a clutch 22, in this example. The transmission 20 may optionally be coupled to a second electric machine 24. If present, the second electric machine 24 is also electrically coupled to the battery pack 18. The transmission 20 is connected to a shaft 26, which is coupled to vehicle drive wheels 28 through a power transfer unit 30. The power transfer unit 30 may be a drive gear system.

While first and second electric machines 16, 24 are shown, this disclosure extends to vehicles with one or more of the first and second electric machines 16, 24. Having a combination of the first and second electric machines 16, 24, may be referred to as a combination of P0 and P3 hybrid architectures. This disclosure also extends to vehicles having electric machines other than the two types of electric machines shown in FIG. 1, and in particular extends to P0, P1, P2, P3, and P4 hybrid architectures, and combinations thereof.

In one embodiment, the engine 14 is an internal combustion engine. The first electric machine 16 is configured to start the engine. The first electric machine 16, in this example, is not configured to drive the vehicle 12 on its own. Rather, the functions of the first electric machine 16 include, for example, starting the engine 14, assisting the engine 14 by producing mechanical torque by drawing power from the battery pack 18, and capturing energy from the vehicle 12 and directing that energy to the battery pack 18, where it is stored.

The first electric machine 16 is operable in two modes. In a first mode of operation, the first electric machine 16 produces torque to either supplement the torque produced by the engine 14 or for use in starting the engine 14. In a second mode of operation, the first electric machine 16 is driven by the engine 14 to produce electrical power for storage in the battery pack 18. The vehicle 12 may have start-stop functionality, wherein the engine 14 shuts down and restarts, with the assistance of the first electric machine 16, to reduce the amount of time the engine 14 spends idling, thereby reducing fuel consumption and emissions.

The second electric machine 24, if present, is also operable in two modes. In a first mode of operation, the second electric machine 24 produces torque and applies that torque to the transmission 20. In a second mode of operation, the second electric machine 24 is driven by the transmission 20 and produces electrical power for storage in the battery pack 18.

In this example, the vehicle 12 includes at least one auxiliary component 32 powered by the battery pack 18. The auxiliary component(s) 32 may include a single auxiliary component or a plurality of auxiliary components. Example auxiliary components include an electric brake component, a damper, a chassis component, and a steering component, among others. These components are relatively high voltage electronic components, and in one example each of the auxiliary component(s) 32 is configured to be run on 48 Volts.

The illustrated battery pack 18 is one exemplary type of an electrified vehicle battery assembly and may take the form of a high voltage battery that is capable of outputting electrical power to operate the first and second electric machines 16, 24 and the auxiliary component(s) 32. The battery pack 18 provides a 48 Volt battery, in one example.

The battery pack 18 includes a plurality of strands of battery cells. In this disclosure, the battery pack 18 includes a first strand 34, a second strand 36, and a third strand 38. In this example, the first, second, and third strands 34, 36, 38 are arranged in parallel to one another, and each provide substantially the same nominal voltage, which is 48 Volts.

Each of the first, second, and third strands 34, 36, 38 of cells includes a plurality of cells 40 arranged either in series or in parallel to one another. The cells 40 within each of the first, second, and third strands 34, 36, 38 have substantially the same cell chemistry. In one example, each of the first, second, and third strands 34, 36, 38 provides a nominal voltage of 48 Volts. In that example, each of the first, second, and third strands 34, 36, 38 includes 12 lithium ion cells, which are arranged in series to provide each strand with a nominal voltage of 48 Volts. While three strands of cells are shown in FIG. 1, it should be understood that this disclosure extends to battery packs having two or more strands of cells.

The first, second, and third strands 34, 36, 38 are capable, both independently and as a group, of powering the first electric machine 16, the second electric machine 24 (if present), and the auxiliary component(s) 32. However, during some operational conditions of the vehicle 12, the voltage of the battery pack 18 may fluctuate due to the power demands of one or more components. In one particular example, during an engine start operation, the first electric machine 16 has a relatively high power demand. Accordingly, the battery pack 18 is configurable to isolate the auxiliary component(s) 32 from fluctuations in voltage caused by the relatively high power demand. In other words, the battery pack 18 is essentially splittable. When split, the first electric machine 16, for example, is able to draw power from the battery pack 18 without disturbing the operation of the auxiliary component(s) 32.

When split, the battery pack 18 is configurable such that the auxiliary component(s) 32 is able to draw power from the first strand 34 but not the second strand 36. Likewise, when split, the battery pack 18 is configurable such that the first electric machine 16 and/or the second electric machine 24 (if present) is able to draw power from the second strand 36 but not the first strand 34. In the illustrated example, in which the battery pack 18 includes first, second, and third strands 34, 36, 38, the battery pack 18 is configurable such that the first electric machine 16 and/or the second electric machine 24 are able to draw power from the second and third strands 36, 38, but not the first strand 34. Likewise, the battery pack 18 is configurable such that the auxiliary component(s) 32 is able to draw power from the first strand 34, but not the second or third strands 36, 38. In this way, the battery pack 18 is able to provide power to the first and/or second electric machines 16, 24 with the second and third strands 36, 38, without disturbing the operation of the auxiliary component(s) 32.

In one example of this disclosure, in order to achieve the aforementioned split of the battery pack 18, the battery pack 18 includes a switch 42 between the first strand 34 and the second strand 36. The switch 42 is configured to open and close in response to instructions from a controller 44. The switch 42 may be any known type of switch. When the switch 42 is open, the auxiliary component(s) 32 is electrically coupled only to the first strand 34, and is not coupled to the second or third strands 36, 38. Further, the first and second electric machines 16, 24 are electrically coupled to the second and third strands 36, 38, and are not coupled to the first strand 34.

The switch 42 may be closed during operational conditions of the vehicle 12 in which the first or second electric machines 16, 24 do not have relatively high power demands. When the switch 42 is closed, the auxiliary component(s) 32 and the first and second electric machines 16, 24 are electrically coupled to each of the first, second, and third strands 34, 36, 38. Further, when the switch 42 is closed, a state of charge (SOC) of the first strand 34 is configured to balance with the SOC of the second and third strands 36, 38, as discussed below.

During a period where the battery pack 18 is split (i.e., when the switch 42 is open), an SOC of the second and third strands 36, 38 may be lower, equal to, or higher than that of the first strand 34. When the SOC is not equal, when closing the switch 42, current is configured to flow between the first strand 34 and the second and third strands 36, 38. It may be beneficial to control the current flowing between the first strand 34 and the second and third strands 36, 38. Thus, the battery pack 18 may include a DC-to-DC converter 46 between the first strand 34 and the second and third strands 36, 38. The DC-to-DC converter 46 is operable to convert current from one voltage level to another. A DC-to-DC converter 46 is not required in all examples. For example, the controller 44 could monitor the SOC of the strands 34, 36, 38, and close the switch 42 if the difference between the SOC of the strands 34, 36, 38 exceeds a predetermined threshold. When present, however, the DC-to-DC converter 46 may be bi-directional, since the SOC difference between strands 34, 36, 38 may be either positive or negative, and accordingly current may flow in either direction between strands.

Both the switch 42 and, if present, the DC-to-DC converter 46 are responsive to instructions from the controller 44. It should be understood that the controller 44 could be part of an overall vehicle control module, such as a vehicle system controller (VSC), or could alternatively be a stand-alone controller separate from the VSC. Further, the controller 44 may be programmed with executable instructions for interfacing with and operating the various components of the vehicle 12. The controller 44 additionally includes a processing unit and non-transitory memory for executing the various control strategies and modes of the vehicle system.

FIG. 2 illustrates a table 100 representative of an example drive sequence. In this sense, the table 100 is also representative of an example method of use. The table 100 includes three columns 102, 104, 106 associated with three times, $T_1$, $T_2$, and $T_3$. The cells of the table 100 indicate the behavior of the various components of the vehicle 12 at times $T_1$, $T_2$, and $T_3$. The relevant components of the vehicle 12 are listed in the left-hand column of the table 100.

Time $T_1$, in this example, is representative of a time where the vehicle 12 is traveling under normal operating conditions. For example, at time $T_1$, the engine 14 may be driving the vehicle drive wheels 28 and at least one of the first and second electric machines 16, 24 is active. In particular, at least one of the first and second electric machines 16, 24 may be driven by the engine 14 to produce electrical power. Alternatively, the first and second electric machines 16, 24 provide supplemental torque, which is used to drive the vehicle 12.

At time $T_1$, the auxiliary component(s) 32 is not active. As such, the switch 42 is closed, meaning first and second electric machines 16, 24 are electrically coupled to each of the first, second, and third strands 34, 36, 38. At time $T_1$, the first, second, and third strands 34, 36, 38 have the same SOC. In this particular example, the SOC of the first, second, and third strands 34, 36, 38 is 55%. Further, the DC-to-DC converter 46 may be active.

Time $T_2$ is representative of a time where the engine 14 is starting (i.e., an engine start operation). When starting, at least the first electric machine 16 is active. Again, the first electric machine 16 may be a BISG. Further, at time $T_2$, the auxiliary component(s) 32 is active. Further, the switch 42 is open, and thus the auxiliary component(s) 32 draw power from the first strand 34 but not the second or third strands 36, 38. Further, the first and/or second electric machines 16, 24 draw power from the second and third strands 36, 38, but not the first strand 34. As mentioned, the power draw of the first electric machine 16, for example, during engine start may be relatively high. The increased power draw causes fluctuations in voltage. If the switch 42 were not open, those fluctuations may cause disturbances in the operation of the auxiliary component(s) 32. As such, opening the switch 42 allows the auxiliary component(s) 32 to draw power from one part of the battery at a relatively constant voltage, without being disturbed by the relatively high power draw on the other parts of the battery.

Further, at time $T_2$, the SOC of the second and third strands 36, 38 has dropped from 55% at $T_1$ to 30%, while the SOC of the first strand 34 has dropped a lesser amount, from 55% at $T_1$ to 50%. Finally, since the switch 42 is open at time $T_2$, the DC-to-DC converter 46 is inactive. While an engine starting condition is discussed relative to time $T_2$, the switch 42 could also be open during other engine operating conditions, such as during a traction assist operation.

Splitting the battery pack 18 by opening the switch 42 may cause the second and third strands 36, 38 to be drained moreso than if the battery pack 18 were not split. As such, when the switch 42 is closed again, the SOC of the first strand 34 is configured to balance with the SOCs of the second and third strands 36, 38. In one example, at time $T_3$, the first and second electric machines 16, 24 are inactive but the auxiliary component(s) 32 is active. Thus, the switch 42 is closed, allowing the auxiliary component(s) 32 to draw power from the first, second, and third strands 34, 36, 38. Further, since the first strand 34 has a higher SOC than the second and third strands 36, 38, current flows from the first strand 34 to the second and third strands 36, 38. In this way, the first strand 34 charges the second and third strands 36, 38. As such, the SOC of the first strand 34 is reduced and the SOC of the second and third strands 36, 38 increases. This continues until the SOC of the first, second, and third strands 34, 36, 38 is balanced. In this example, the SOC is balanced when each of the strands 34, 36, 38 has an SOC of 36%.

Further, the DC-to-DC converter 46 is active during time $T_3$. Activating the DC-to-DC converter 46 reduces stress on the battery pack 18, which could impact the durability of the battery pack 18. The DC-to-DC converter 46 also reduces the likelihood that closing the switch 42 would cause an arc, which would be undesirable.

It should be understood that terms such as "about," "substantially," and "generally" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An electrified vehicle, comprising:
   a battery including a first strand of cells and a second strand of cells;
   an electric machine selectively powered by the battery; and
   at least one auxiliary component selectively powered by the battery, wherein the battery is configurable such that the at least one auxiliary component is able to draw power from the first strand of cells but not the second strand of cells, and wherein the battery is configurable such that a state of charge of the first strand is able to balance a state of charge of the second strand.

2. The electrified vehicle as recited in claim 1, wherein the battery is configurable such that the electric machine is able to draw power from the second strand of cells but not the first strand of cells.

3. The electrified vehicle as recited in claim 2, wherein the battery includes a third strand of cells, and wherein the battery is configurable such that the electric machine is able to draw power from the second and third strands of cells but not the first strand of cells.

4. The electrified vehicle as recited in claim 2, further comprising:
   a controller;
   a switch between the first and second strands of cells, the switch configured to open and close in response to instructions from the controller;
   wherein, when the switch is open, the at least one auxiliary component is able to draw power from the first strand of cells but not the second strand of cells, and the electric machine is able to draw power from the second strand of cells but not the first strand of cells.

5. The electrified vehicle as recited in claim 4, wherein, when the switch is closed, the first and second strands of cells are electrically coupled together in parallel.

6. The electrified vehicle as recited in claim 5, wherein, when the switch is closed, the battery is configured to balance a state of charge of the first strand of cells and a state of charge of the second strand of cells.

7. The electrified vehicle as recited in claim 5, wherein, when the switch is closed, both the at least one auxiliary component and the electric machine are able to draw power from the first and second strands of cells.

8. The electrified vehicle as recited in claim 4, further comprising:
   a DC-to-DC converter between the first and second strands of cells.

9. The electrified vehicle as recited in claim 1, wherein the electrified vehicle includes a first and second electric machine, and wherein the battery is configurable such that the first and second electric machines are able to draw power from the second strand of cells but not the first strand of cells.

10. The electrified vehicle as recited in claim 1, wherein the electric machine includes a belt-integrated starter-generator.

11. The electrified vehicle as recited in claim 1, wherein the at least one auxiliary component includes at least one of an electric brake component, a damper, a chassis component, and a steering component.

12. The electrified vehicle as recited in claim 1, wherein the first and second strands of cells each include a plurality of cells arranged in series, and wherein the first and second strands of cells each provide the same nominal voltage.

13. The electrified vehicle as recited in claim 12, wherein the electrified vehicle is a mild hybrid vehicle.

14. A method, comprising:
   powering at least one auxiliary component of an electrified vehicle with a first strand of cells of a battery but not a second strand of cells of the battery, wherein the electrified vehicle includes an electric machine selectively powered by the battery; and
   balancing a state of charge of the first strand of cells and a state of charge of the second strand of cells.

15. The method as recited in claim 14, further comprising:
   powering the electric machine with the second strand of cells but not the first strand of cells.

16. The method as recited in claim 15, further comprising:
   opening a switch between the first and second strands of cells.

17. The method as recited in claim 16, wherein the switch is opened during one of an engine start operation and a traction assist operation.

18. The method as recited in claim 16, further comprising:
   closing the switch;
   powering the at least one auxiliary component with the first and second strands of cells; and
   powering the electric machine with the first and second strands of cells.

19. The method as recited in claim 18, further comprising:
   converting current from one voltage level to another as it flows between the first strand of cells and the second strand of cells.

* * * * *